United States Patent

[11] 3,610,285

[72] Inventor Charles Passaggio
 Cheshire, Conn.
[21] Appl. No. 884,209
[22] Filed Dec. 11, 1969
[45] Patented Oct. 5, 1971
[73] Assignee Scovill Manufacturing Company
 Waterbury, Conn.

[54] SLIDING VALVE
 2 Claims, 5 Drawing Figs.
[52] U.S. Cl. ............................................ 137/625.66,
  251/84, 251/368, 251/284
[51] Int. Cl. ...................................................... F16k 11/07
[50] Field of Search ............................................ 137/625.48,
  625.66, 625.67, 625.37, 625.33, 625.34; 251/190,
  284, 186, 176, 84–88, 368

[56] References Cited
 UNITED STATES PATENTS
1,189,722  7/1916  Murphy ........................  251/176

| | | | |
|---|---|---|---|
| 2,701,704 | 2/1955 | Lawrence .................... | 251/284 X |
| 2,998,828 | 9/1961 | Hare ............................ | 137/625.48 X |
| 3,227,180 | 1/1966 | Tissot-Dupont ............. | 137/625.66 |
| 3,303,853 | 2/1967 | Bouthiller .................... | 137/625.48 |
| 3,349,800 | 10/1967 | Herion et al. ................ | 137/625.48 X |

FOREIGN PATENTS

| 558,182 | 2/1957 | Italy ............................. | 251/176 |
|---|---|---|---|
| 939,609 | 2/1956 | Germany ...................... | 137/625 A8 |

*Primary Examiner*—Henry T. Klinksiek
*Attorney*—Dallett Hoopes

ABSTRACT: A sliding valve has a plastic valve element which has a working face, this face only engaging the housing adjacent the ports. The face of the element has legs extending longitudinally of the valve and nonaligned with the valve opening so that if tipping of the valve element occurs, it will not result in the catching of the leading edge of the valve element in the valve openings and the nonfunctioning of the valve.

PATENTED OCT 5 1971  3,610,285

INVENTOR.
CHARLES PASSAGGIO
BY Dallett Hoopes

SLIDING VALVE

This invention relates to sliding valves. More specifically, this invention relates to valves especially adapted to connect a vacuum source to two or more flow paths successively.

The prior art is replete with disclosures of sliding valves adapted to change flow patterns in a fluid circuit as the valve element is moved back and forth. Most of these valves involve a cylindrical housing with ports about the periphery thereof and a spool or other movable valve element reciprocably disposed within that housing and having recesses adapted to connect the various ports in different flow patterns as the valve element moves back and forth. As can be imagined, in order to avoid leakage, the interior of the housing or the valve element must be equipped with peripherally disposed O-rings, or other sealing means between the ports. If such sealing means are not provided, there is eventually some leakage even if the machining of the housing and the valve element is of extremely close tolerance.

It can be seen that valves of the sliding type which minimize leakage are relatively expensive since they involve either a number of parts such as specially mounted O-rings or extremely high-quality machining techniques. It has been attempted to reduce cost by making the valve element of plastic in its entirety to reduce the necessity for supplemental sealing means. Such valves have been sensitive to temperature variations to the point where the valve, depending on the temperature, has either frozen in its housing or leaked.

It is an object of the present invention to provide a valve element composed of plastic in its entirety, the contact of plastic with the wall of the housing being limited to the zone right around the ports. This enables valves embodying the invention to perform without binding or leaking under even extreme temperature variations.

It is a further object of the invention to provide a sliding valve having a valve element of plastic with special means should tipping occur to avoid the catching of the leading edge of the valve in the valve opening which would otherwise stall the valve.

It is a further object of the invention to provide a valve inexpensive to produce and readily producible by mass production techniques.

Other objects of the invention will be apparent from a reading of the following specification including reference to the drawings wherein.

Figure 1:
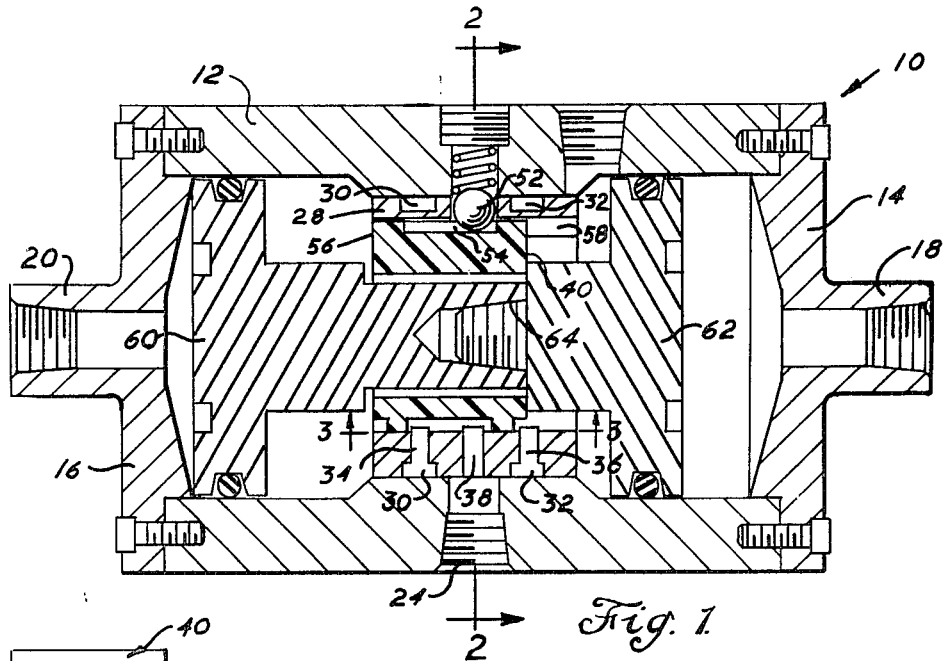
FIG. 1 is a sectional view of a sliding valve embodying the invention.

Referring more specifically to the drawings, a valve embodying the invention is generally designated 10 in FIG. 1. It comprises a housing shell 12 of generally tubular shape and end walls 14 and 16 secured to the shell as shown. Each of the end walls is provided with a fitting 18, 20, for supplying motive fluid thereto.

Figure 2:
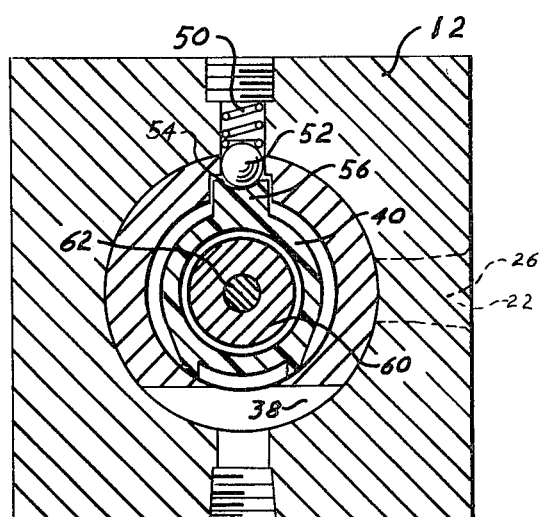
FIG. 2 is a sectional view taken on the line 2—2 of FIG. 1.

Formed in the shell 12 are a plurality of spaced ports 22, 24 and 26 (FIGS. 1 and 2). These ports communicate from the exterior of the shell to the interior in a central thickened portion as shown and each of the ports are internally tapped for connection of fluid lines.

A tubular liner 28 is press-fitted snugly against the wall of the shell at the thickened portion. As shown, the outer periphery of the liner is formed with spaced peripheral channels 30 and 32 communicating respectively with the ports 22 and 26. As shown, in its lower portion the liner has slots milled therein, two of which, 34 and 36, communicate respectively with the channels 30 and 32. A central slot 38 milled through the liner is in alignment with the port 24 and communicates therewith. The slots 34, 36 and 38 penetrate the liner on the inside as shown in phantom in FIG. 3.

Figure 3:
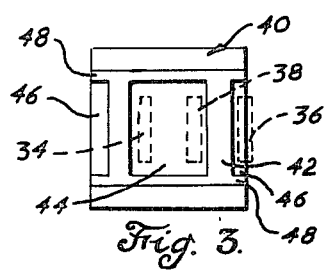
FIG. 3 is a view taken looking upward in the plane of the line 3—3 of FIG. 1 and showing a phantom the openings in the valve liner.
Figure 4:
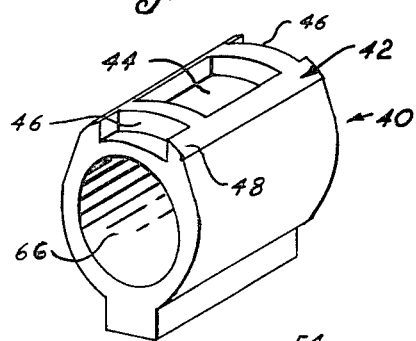
FIG. 4 is a perspective view of a valve element taken from the bottom and to one side with respect to FIG. 1.
Figure 5:
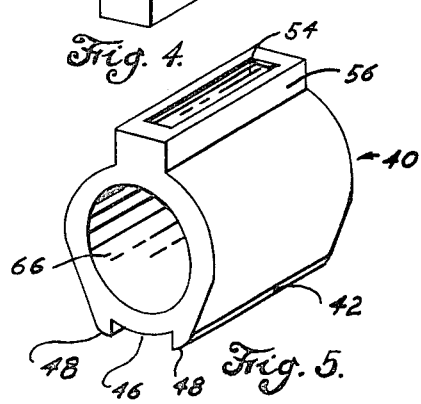
FIG. 5 is a perspective view of a valve element taken from the top and to one side with respect to FIG. 1.

Reciprocable within the liner is the valve element 40. This element may be in its entirety made of Delrin, an acetal resin; Teflon, a brand of polytetrafluoroethylene; or other tough, durable plastic preferably having self-lubricating properties. As shown in FIG. 2, the valve element 40 engages the inside of the liner only in the valve-operating zone adjacent the slots. In the area of engagement, the engaging face of the element 40 is formed with a curvature comparable to the inside of the liner and the face 42 is formed with a central recess 44. The face is also notched away at either end as at 46 to define oppositely directed legs 48 extending beyond the central portions which engage the liner. As shown in FIG. 3, the recess is ample to cover two adjacent slots 34 and 38 simultaneously and permit them to communicate but not ample enough to also cover the slot 36. Thus, when the valve element is in the position shown in FIG. 1, slots 34 and 38 communicate connecting port 24 and port 22 (FIG. 2) which connects to channel 30 and slot 34. When the valve is moved rightwardly, slots 38 and 36 are communicated by the recess 44 which does not then cover slot 34. As a result, in the rightward position ports 24 and 26 (which communicate with slot 36) are connected.

As shown, the housing and liner are apertured at 50 and a spring-pressed ball 52 engages the upper end of the valve element in a track 54. The track is surrounded by a curb 56 which moves in the slot 58 in the liner keeping the valve element from rotating. The spring-pressed ball 52 serves not only to press the face 42 of the valve element against the liner to prevent leakage between the liner and the valve particularly at the commencement of operation, but also by design of the track 54 limits the movement of the valve element in a rightward or leftward direction to prevent overshooting of the respective valve positions. Significantly, in vertical mountings of the valve, the spring-pressed ball holds the valve element from dropping when the control and working fluid supply is shut off.

While the valve element may be driven by solenoid or manually, in the version shown, it is driven by fluid means comprising the double pistons 60 and 62 yoked together as at 64 through an opening 66 in the valve element. Each of the pistons has sealing means which engage the wall of the valve housing so that fluid driven successively into fittings 18 and 20 may control the reciprocation of the valve. It will be understood that a special feature of the present invention are the legs 48 formed in the face of the valve element which are not in alignment with the slots 34, 36, 38 and which serve to stabilize the valve element and prevent tipping of the valve which might otherwise occur when a leading edge of the face 42 engages an edge of one of the slots.

More generally, the invention offers the advantages of an inexpensive, simple, sliding valve adapted especially to communicate vacuum to a plurality of lines successively. It should be understood that pressure may be applied to the plurality of lines successively provided the pressure surrounding the valve element outside of the face 42 exceeds the highest pressure which the recess of valve element works on. For instance, in an operating reciprocating motor the valve 10 is used with its port 24 into the main chamber connected to the pressure source and the ports 22 and 26 connected to the opposite ends of the motor. The pressure thus communicates alternately to the ports 22 and 26 slots 36, 34 which are on the outside of the valve element. At the same time, the recess 44 of the valve element alternately connects the same slots to the slot 38 which is the exhaust.

I claim:

1. A sliding valve comprising
   a. a hollow housing having spaced ports extending through the periphery thereof;
   b. a liner in the housing having spaced openings aligned in a valve operating zone extending longitudinally of the liner, the openings being in communication respectively with the ports;
   c. a one-piece valve element comprising a block of resilient plastic having a face slidably engaging the liner in the zone and conforming there to the shape of the liner; the face having a recess therein large enough to cover two adjacent of said openings, the each end of the face having at least one liner-engaging leg extending longitudinally of the liner a short distance beyond the face and being in nonalignment with the openings to avoid the tipping of the valve element and the binding of the end edge of the face in the openings; and d. means to move the valve element longitudinally of the liner and housing to alter the port communication pattern of the valve.

2. A sliding valve as described in claim 1 wherein spring means is provided in the housing to engage the valve element and urge it against the liner.